(12) United States Patent
Matsuura

(10) Patent No.: US 7,353,987 B2
(45) Date of Patent: Apr. 8, 2008

(54) PRINTER AND CONTROL METHOD OF PRINTER

(75) Inventor: Shingo Matsuura, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/563,456

(22) Filed: Nov. 27, 2006

(65) Prior Publication Data

US 2007/0158425 A1    Jul. 12, 2007

(30) Foreign Application Priority Data

Dec. 19, 2005  (JP) .............................. 2005-364344

(51) Int. Cl.
*G06F 17/00* (2006.01)
(52) U.S. Cl. ..................................... 235/375; 235/462
(58) Field of Classification Search ................ 235/375, 235/462
See application file for complete search history.

(56) References Cited

U.S. PATENT DOCUMENTS 7,287,698 B2 * 10/2007 Barrus .................. 235/462.15

2004/0124242 A1 * 7/2004 Critelli et al. ......... 235/462.08
2005/0224572 A1 * 10/2005 Kelley et al. ............... 235/375

FOREIGN PATENT DOCUMENTS

JP    08-310050 A    11/1996

* cited by examiner

*Primary Examiner*—Lisa Caputo
*Assistant Examiner*—Tuyen Kim Vo
(74) *Attorney, Agent, or Firm*—Canon USA Inc IP Division

(57) ABSTRACT

A printer includes a reading unit to read an original that includes a machine-readable code, an extraction unit to extract the machine-readable code from the original, and a scaling unit to reduce the original. The printer further includes a detection unit to detect a margin area in the reduced original, a combining unit to combine the extracted machine-readable code with the reduced original in the margin area if the size of the margin area is larger than the size of the machine-readable code, and a printing unit to print the combined data.

15 Claims, 7 Drawing Sheets

PRINTER AND CONTROL METHOD OF PRINTER

BACKGROUND OF THE INVENTION

1. Field of the Invention

The present invention relates to an apparatus and a method for reducing and printing an original (e.g., document) that includes a machine-readable code such as a barcode.

2. Description of the Related Art

Currently, various pieces of information are bar-coded. In addition to known one-dimensional barcodes, two-dimensional barcodes such as a QR (Quick Response) code are often used in books and advertisements.

An apparatus capable of detecting in advance that the size of a barcode included in a document will deviate from a standard when the document is enlarged or reduced is known (see, for example, Japanese Laid-Open No. 8-310050).

The above-described apparatus reduces and prints at least one of an image and text which includes a barcode without reducing the size of the barcode. In this case, an image portion or a text portion that has been present around the barcode before the reduced-size copying is performed is sometimes omitted due to the fact that the barcode is not reduced in size.

SUMMARY OF THE INVENTION

An embodiment of the present invention provides a printer capable of preventing omission of an image portion or a text portion that is described adjacent to a machine-readable code (e.g., barcode) when the printer reduces and prints at least one of an image and text which includes the machine-readable code without reducing the machine-readable code so as not to deviate from a machine-readable code standard.

According to an aspect of the present invention, an embodiment is directed to a printer that includes: a reading unit configured to read an original on which a machine-readable code is described; an extraction unit configured to extract the machine-readable code from the original read by the reading unit; a scaling unit configured to reduce the original; a detection unit configured to detect a margin area in the original reduced by the scaling unit; a comparison unit configured to compare a size of the margin area detected by the detection unit with a size of the machine-readable code extracted by the extraction unit; a combining unit configured to combine the machine-readable code extracted by the extraction unit with the reduced original in the margin area when it has been determined by the comparison unit that the size of the margin area is larger than the size of the machine-readable code; and a printing unit configured to print combined data generated by the combining unit on a recording medium.

According to another aspect of the present invention, an embodiment is directed to a method of controlling a printer. The method includes: scanning a document that includes a machine-readable code; extracting the machine-readable code from the scanned document; reducing a size of the scanned document after the machine-readable code has been extracted from the scanned document to generate a reduced document; detecting a margin area in the reduced document; comparing a size of the detected margin area with a size of the machine-readable code; combining the machine-readable code with the reduced document in the detected margin area if the size of the detected margin area is larger than the size of the machine-readable code; and printing combined data on a recording medium.

According to an embodiment of the present invention, when a document including an image/text and a machine-readable code such as a QR code is to be reduced and printed, the machine-readable code can be printed without deviating from a machine-readable code standard. Additionally, an image or text portion that is described adjacent to the machine-readable code before the reduced-size copying is performed can also be prevented from being omitted.

Further features of the present invention will become apparent from the following description of an exemplary embodiment with reference to the attached drawings.

BRIEF DESCRIPTION OF THE DRAWINGS

FIGS. 2A and 2B are diagrams showing an example according to an embodiment in which a barcode described on an original is moved and printed when the original is to be reduced and copied.

DESCRIPTION OF THE EMBODIMENT

Figure 1:
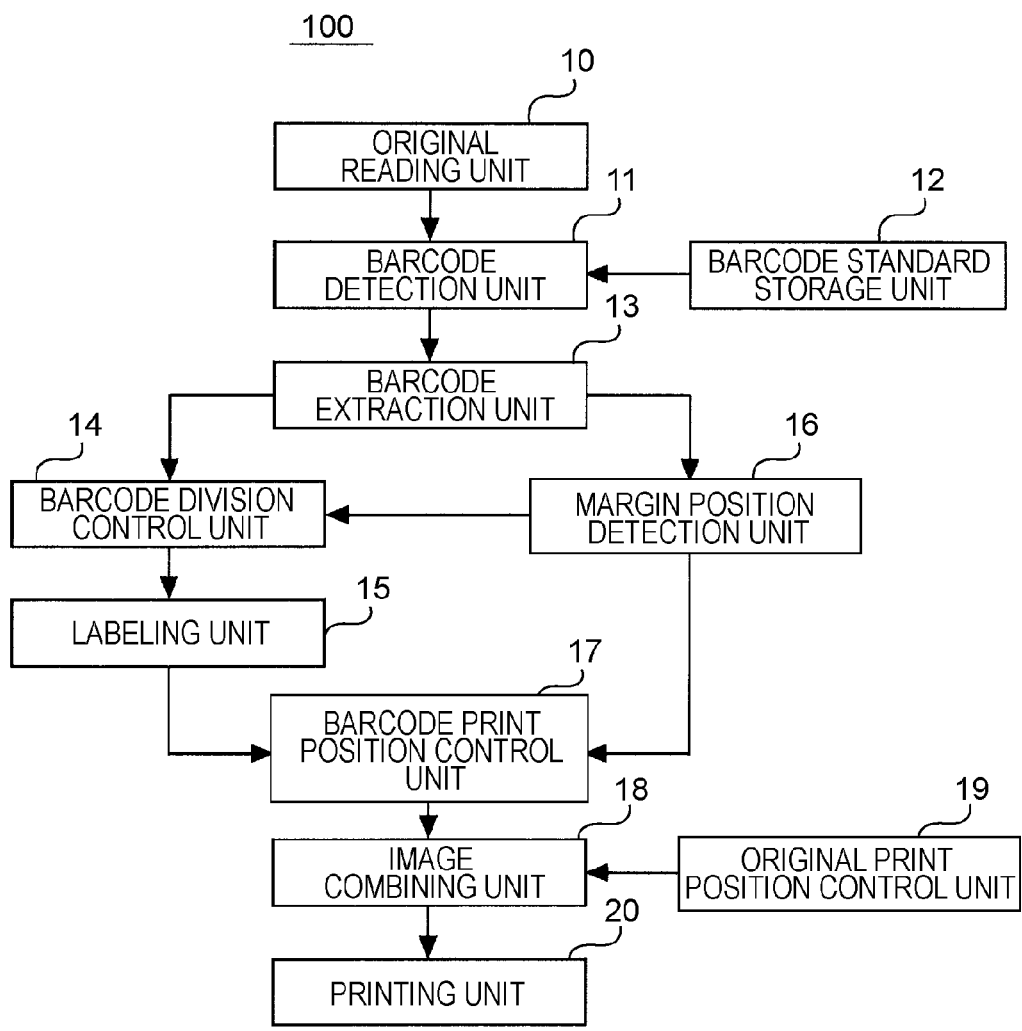
FIG. 1 is a diagram showing a configuration of a printer according to an embodiment of the present invention.

FIG. 1 is a diagram showing the configuration of a printer 100 according to an embodiment of the present invention.

The printer 100 is provided with an original reading unit 10, a barcode standard storage unit 12, a barcode detection unit 11, a barcode extraction unit 13, a barcode division control unit 14, a labeling unit 15, a margin position detection unit 16, a barcode print position control unit 17, an image combining unit 18, an original print position control unit 19, and a printing unit 20.

The original reading unit 10 is equivalent to a scanner of a copier, a multifunction printer, or the like, and reads an original set on a platen glass by a user. The barcode standard storage unit 12 stores a barcode standard such as a barcode size so as to detect a barcode.

The barcode detection unit 11 detects a barcode from the original set on the platen glass on the basis of information stored in the barcode standard storage unit 12. As a detection method, for example, a similarity level between a certain object included in the original and the information stored in the barcode standard storage unit 12 is obtained using, for example, a cross-correlation function (template matching). If the obtained similarity level is larger than a given threshold value, it is determined that there is a barcode in the original.

The barcode extraction unit 13 extracts only an image of a barcode at a position detected by the barcode detection unit 11, and stores the image.

On the basis of a barcode size detected by the barcode detection unit 11, the margin position detection unit 16 detects a position at which a barcode can be described (e.g., pasted, printed) without omitting a text portion or an image portion when the text or image is enlarged or reduced.

FIGS. 2A and 2B are diagrams showing an example according to the embodiment in which a barcode described on an original is moved and printed when the original is to be reduced and copied.

For example, if an original including a barcode shown in FIG. 2A is reduced and copied, a blank part appears (text omission occurs) at a position corresponding to an original position at which the barcode was described before the original is reduced and copied as shown in FIG. 2B with a dotted box.

In order to prevent the occurrence of the text omission, an appropriate position at which the barcode (e.g., the original sized barcode) can be described (e.g., printed) in the reduced original is detected. To this end, a position at which the barcode (e.g., the original sized barcode) can be described (e.g., printed) in the reduced original without omitting a text portion, that is, at which text data does not exist within a barcode-printed area, is detected using a cross-correlation method (template matching) or the like.

If the margin position detection unit 16 cannot secure a margin area for printing the barcode of the original size (the area of the barcode configured not to be reduced) therein, the barcode division control unit 14 divides the information on the barcode, and regenerates barcode data.

For example, in the case of a two-dimensional barcode such as a QR code, information on a single barcode can be divided to generate a plurality of barcode portions of a smaller size. The number of barcode divisions is controlled in accordance with a margin area.

If a barcode is divided, the labeling unit 15 provides the divided barcode portions with labels that represent continuity between the divided barcode portions. If a plurality of originals are printed on a single page, for example, if a "2 in 1" or "4 in 1" copy function is selected, the labeling unit 15 provides the barcodes and the originals with labels that allow a user to determine correspondences between the originals and the barcodes.

The barcode print position control unit 17 decides the more appropriate barcode print position on the basis of the processing results of the margin position detection unit 16, the barcode division control unit 14, and the labeling unit 15.

The image combining unit 18 combines image data of the original with the print position data of the barcode on the basis of the processing result of the barcode print position control unit 17 to generate image data to be printed out.

The original print position control unit 19 automatically, or in accordance with a user's selection, secures the area in which the barcode can be printed, and then prints the image data included in the original other than the barcode.

Figure 3B:
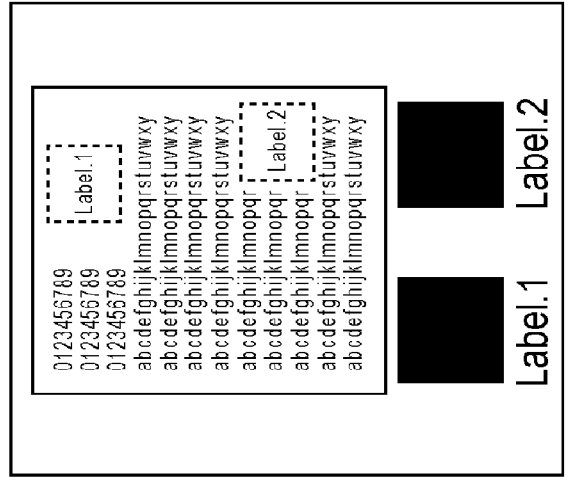
FIGS. 3A and 3B are diagrams showing an example according to an embodiment in which barcodes described on an original are moved and printed when the original is to be reduced and copied.
Figure 3A:

FIGS. 3A and 3B are diagrams showing an example according to the embodiment in which barcodes described on an original are moved and printed when the original is to be reduced and copied.

The case in which a plurality of barcodes are described on the same page as shown in FIG. 3A will be considered. It is assumed that, when the barcodes and reduced text or an reduced image other than the barcodes are attempted to be printed on the same page, it is determined that it is difficult to detect barcode print margin positions for the barcodes from image data of the reduced text or image other than the barcodes. In this case, after the print positions of the barcodes have been secured, a reduction ratio and a print position of the image data other than the barcodes are set. FIG. 3B shows an exemplary print result in this case.

The printing unit 20 is equivalent to an inkjet printer or a laser beam printer, and prints image data.

Next, processing according to the embodiment will be described.

Figure 4:
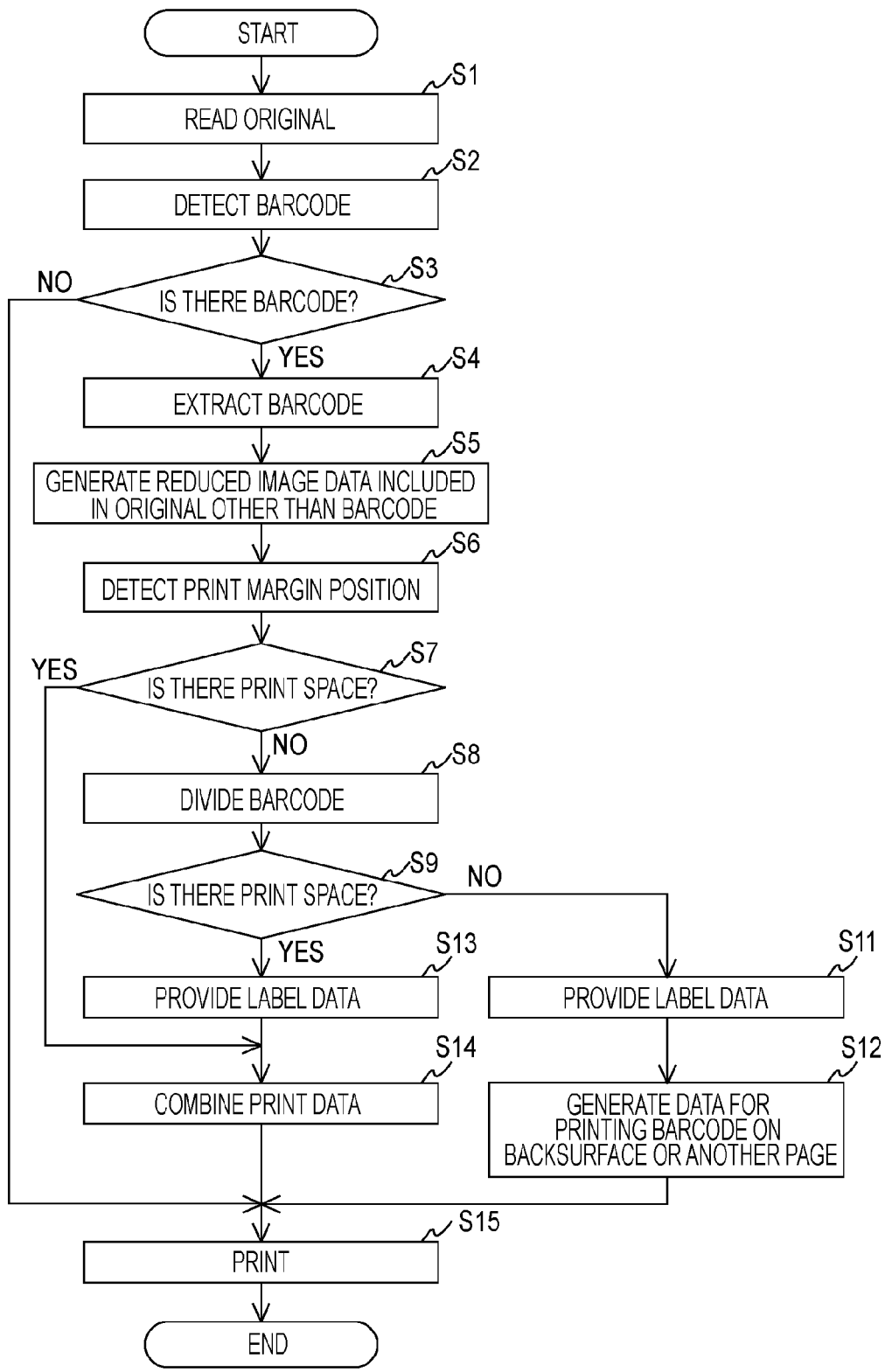
FIG. 4 is a flowchart showing a processing flow when reduced-size copying is performed in the printer according to an embodiment of the present invention.

FIG. 4 is a flowchart showing the processing flow of the printer 100 according to an embodiment of the present invention.

In step S1, an original set on a platen glass is read. In step S2, barcode detection is performed upon the original. In step S3, it is determined whether there is a barcode in the original. If it has been determined in step S3 that there is no barcode in the original, ordinary print processing is performed in step S15.

If it has been determined in step S3 that there is a barcode in the original, the barcode is extracted in step S4. In step S5, reduced image data of the original which does not include the barcode is generated. In step S6, a position at which the barcode can be printed is detected from the reduced image data that has been generated in step S5.

If it has been determined in step S7 that there is print space for the barcode, print data of the reduced image data is combined with that of the barcode in step S14. If it has been determined in step S7 that there is no space for the barcode, the information on the barcode is divided to generate barcode portions whose size is smaller than that of the barcode.

In step S9, positions at which the generated barcode portions can be printed are detected again from the reduced image data that has been generated in step S5. If it has been determined in step S9 that there is print space for the barcode portions, label data having information on continuity between these barcode portions is provided for the barcode portions in step S13. In step S14, print data based on the label data provided in step S13, the barcode portions, and the reduced image data is generated.

If it has been determined in step S9 that there is no print space for the barcode portions, it is decided that there is no space in which the barcode can be printed with the reduced image data on the same page. On the basis of this result of step S9, in step S11, a label that allows a user to determine a correspondence between the original and the barcode is provided for the barcode so that the barcode can be printed on the backsurface of the copy of the original or on another page.

In step S12, print data based on the provided label data, barcode data for printing the barcode on the backsurface of the copy of the original or on another page, and the reduced image data is generated. In step S15, the generated print data is printed.

Next, the case in which the printer 100 prints on a single page two originals including barcodes will be described.

Figure 5A:
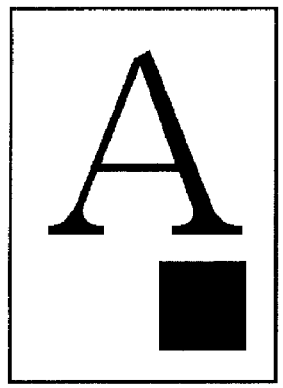
FIGS. 5A and 5B are diagrams showing two input originals of different sizes.
Figure 5B:
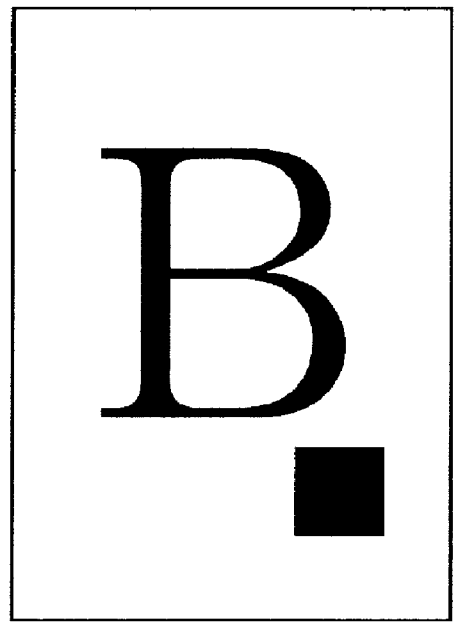

FIGS. 5A and 5B are diagrams showing two input originals of different sizes.

A small original shown in FIG. 5A is an original to be enlarged. A large original shown in FIG. 5B is an original to be reduced.

FIGS. 6 through 9 are diagrams showing the results of printing the originals of different sizes shown in FIGS. 5A and 5B as a single original.

Figure 6:
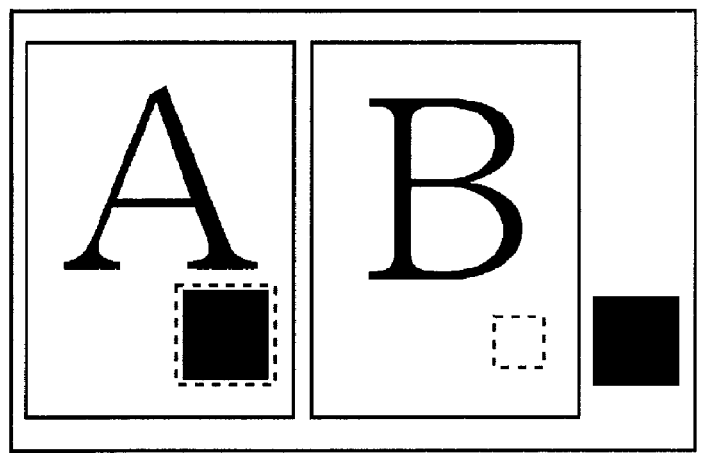
FIG. 6 is a diagram showing an example in which a barcode described on one of the originals is printed at a margin position when the original is to be enlarged or reduced and copied to prevent omission of a document portion or an image portion other than the barcode included in the original, according to an embodiment of the present invention.

FIG. 6 is a diagram showing an example in which a barcode described on one of the originals is printed at a margin position when the original is to be enlarged or reduced and copied to prevent omission of image data included in the original other than the barcode, according to an embodiment of the present invention.

Figure 7:
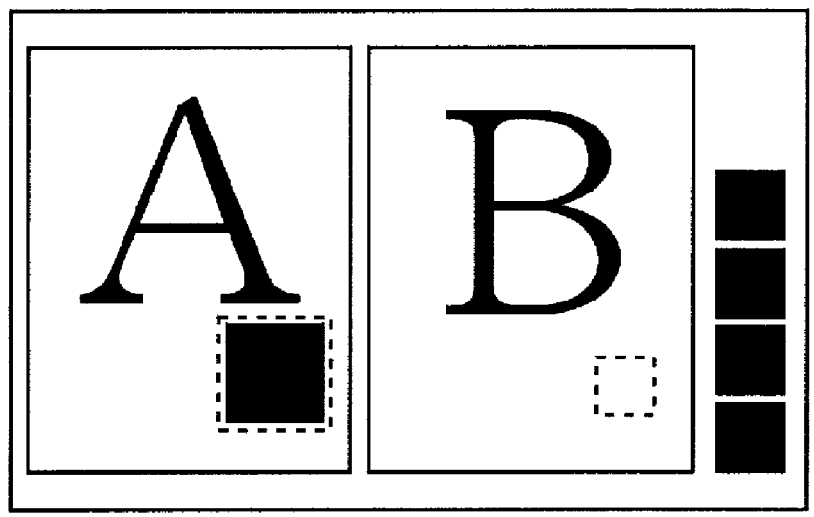
FIG. 7 is a diagram showing an example in which a barcode described on one of the originals is divided and the divided barcode portions are printed at margin positions when the original is to be enlarged or reduced and copied to prevent omission of a document portion or an image portion other than the barcode included in the original, according to an embodiment of the present invention.

FIG. 7 is a diagram showing an example in which a barcode described on one of the originals is divided and the divided barcode portions are printed at margin positions when the original is to be enlarged or reduced and copied to prevent omission of image data included in the original other than the barcode, according to an embodiment of the present invention.

Figure 8:
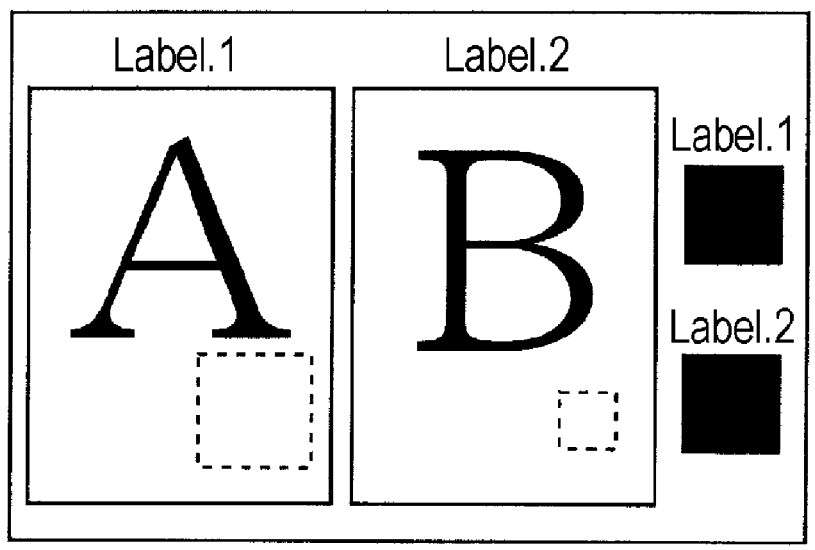
FIG. 8 is a diagram showing an example in which barcodes described on both originals are printed at margin positions irrespective of whether the originals are to be enlarged or reduced and copied, and labels that allow a user to determine correspondences between the originals and the barcodes are provided for the barcodes and the originals and are then printed, according to an embodiment of the present invention.

FIG. 8 is a diagram showing an example in which barcodes described on both originals are printed at margin positions irrespective of whether the originals are to be enlarged or reduced and copied, and labels that allow a user to determine correspondences between the originals and the barcodes are provided for the barcodes and the originals and are then printed, according to an embodiment of the present invention.

Figure 9A:
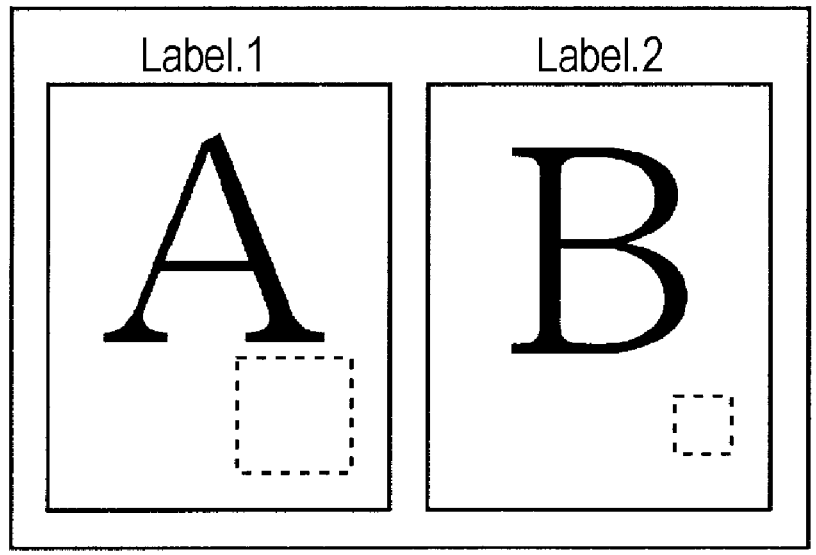
FIGS. 9A and 9B are diagrams showing an example in which, if print space for barcodes cannot be secured when the originals are to be enlarged or reduced and copied, the barcodes are printed on another page different from the page on which text or images other than the barcodes are to be printed or on the backsurface of the page, according to an embodiment of the present invention.
Figure 9B:

FIGS. 9A and 9B are diagrams showing an example in which, if print space for barcodes cannot be secured when the originals are to be enlarged or reduced and copied, the barcodes are printed on another page (FIG. 9B) different from the page (FIG. 9A) on which text or images other than the barcodes are to be printed or on the backsurface (FIG. 9B) of the page (FIG. 9A), according to an embodiment of the present invention.

In this case, labels that allow a user to determine correspondences between the originals and the barcodes are individually provided for the barcodes and the originals, and are then printed. A user can print only the barcodes, only image data included in the originals other than the barcodes, or both of them.

That is, in the above-described embodiment, a barcode capable of being divided such as a QR code is divided into a plurality of barcode portions having a size corresponding to a margin, and then the divided barcode portions are printed. If a plurality of originals are copied on the same page, barcodes included in the originals sometimes cannot be copied on the same page. In this case, the barcodes are printed on the backsurface of the page or on another page, and then labels that allow a user to determine which barcode corresponds to which original are provided and are then printed close to the originals and the barcodes. In addition, if a barcode described on an original is more important for a user than text or an image included in the original, the user can select a mode so that print space for the barcode can be secured first when the original is copied, and then the text or image can be printed in the remaining space.

According to the above-described embodiment, if an image or text is reduced and printed and a barcode is printed so as to be compliant with a barcode standard, an image portion or a text portion that is present around the barcode before reduced-size copying is performed can be prevented from being omitted.

In the above-described embodiment, if it has been determined that it is difficult to print an image or text with a barcode on the same page, the barcode is printed on the backsurface of the page on which the image or text is to be printed or on another page. Accordingly, the omission of an image portion or a text portion of the original can be prevented, and the barcode can be printed with certainty.

If a plurality of originals are copied on the same page, it becomes difficult to copy the originals and barcodes described on the originals on the same page. However, in the above-described embodiment, labels representing correspondences between the originals and the barcodes are individually provided for the barcodes and the originals. Accordingly, confusion between the individual barcodes and false recognition of the barcodes can be prevented.

In the above-described embodiment, a code other than a barcode such as a QR code may be used instead of the barcode.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2005-364344 filed Dec. 19, 2005, which is hereby incorporated by reference herein in its entirety.

What is claimed is:

1. A printer comprising:
   a reading unit configured to read an original on which a machine-readable code is described;
   an extraction unit configured to extract the machine-readable code from the original read by the reading unit;
   a scaling unit configured to reduce the original;
   a detection unit configured to detect a margin area in the original reduced by the scaling unit;
   a comparison unit configured to compare a size of the margin area detected by the detection unit with a size of the machine-readable code extracted by the extraction unit;
   a combining unit configured to combine the machine-readable code extracted by the extraction unit with the reduced original in the margin area when it has been determined by the comparison unit that the size of the margin area is larger than the size of the machine-readable code; and
   a printing unit configured to print combined data generated by the combining unit on a recording medium.

2. The printer according to claim 1, wherein the machine-readable code comprises a barcode.

3. The printer according to claim 1, wherein the scaling unit reduces the original after the machine-readable code has been extracted from the original.

4. The printer according to claim 1, further comprising:
   a storage unit configured to store information on the machine-readable code extracted by the extraction unit; and a generating unit configured to generate divided code portions by dividing the information on the machine-readable code which has been stored in the storage unit, and wherein, when it has been determined by the comparison unit that the size of the margin area is smaller than the size of the machine-readable code, the combining unit combines the divided code portions generated by the generating unit with the reduced original in the margin area, and the printing unit prints the combined data generated by the combining unit.

5. The printer according to claim 1, wherein, when it has been determined by the comparison unit that the size of the margin area is smaller than the size of the machine-readable code, the printing unit prints the combined data generated by the combining unit on both surfaces of the recording medium.

6. The printer according to claim 4, further comprising a labeling unit configured to provide labels corresponding to the divided code portions generated by the generating unit, and wherein the printing unit prints the labels provided by the labeling unit adjacent to the divided code portions.

7. A method comprising:

scanning a document that includes a machine-readable code;

extracting the machine-readable code from the scanned document;

reducing a size of the scanned document after the machine-readable code has been extracted from the scanned document to generate a reduced document;

detecting a margin area in the reduced document;

comparing a size of the detected margin area with a size of the machine-readable code;

combining the machine-readable code with the reduced document in the detected margin area if the size of the detected margin area is larger than the size of the machine-readable code; and printing combined data on a recording medium.

8. The method according to claim 7, wherein the machine-readable code comprises a barcode.

9. The method according to claim 7, further comprising:

storing information on the machine-readable code; and generating divided code portions by dividing the information on the machine-readable code, and wherein if the size of the margin area is smaller than the size of the machine-readable code, the divided code portions are combined with the reduced document in the margin area, and the combined data is printed.

10. The method according to claim 7, wherein if the size of the margin area is smaller than the size of the machine-readable code, the combined data is printed on both surfaces of the recording medium.

11. The method according to claim 9, further comprising providing labels corresponding to the divided code portions, and wherein the labels are printed adjacent to the divided code portions.

12. An apparatus comprising:

a scanning unit configured to scan a document that includes a machine-readable code;

an extraction unit configured to extract the machine-readable code from the scanned document;

a scaling unit configured to reduce the scanned document after the machine-readable code has been extracted from the scanned document to generate a reduced document;

a detection unit configured to detect a margin area in the reduced document;

a comparison unit configured to compare a size of the detected margin area with a size of the machine-readable code; and a combining unit configured to combine the machine-readable code with the reduced document in the detected margin area when it has been determined by the comparison unit that the size of the margin area is larger than the size of the machine readable code.

13. The apparatus according to claim 12, wherein the machine-readable code comprises a barcode.

14. The apparatus according to claim 12, wherein, when it has been determined by the comparison unit that the size of the margin area is smaller than the size of the machine-readable code, the printing unit prints the combined data generated by the combining unit on both surfaces of the recording medium.

15. The apparatus according to claim 12, further comprising:

a printing unit configured to print combined data generated by the combining unit on a recording medium.

* * * * *